(12) United States Patent
Huang et al.

(10) Patent No.: US 11,917,627 B2
(45) Date of Patent: Feb. 27, 2024

(54) MULTIPLEXING A SCHEDULING REQUEST AND A HYBRID AUTOMATIC REPEAT REQUEST ACKNOWLEDGEMENT HAVING DIFFERENT PRIORITIES AND DIFFERENT PHYSICAL UPLINK CONTROL CHANNEL FORMATS

(71) Applicant: QUALCOMM Incorporated, San Diego, CA (US)

(72) Inventors: Yi Huang, San Diego, CA (US); Wei Yang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 97 days.

(21) Appl. No.: 17/643,133

(22) Filed: Dec. 7, 2021

(65) Prior Publication Data
US 2022/0322402 A1 Oct. 6, 2022

Related U.S. Application Data

(60) Provisional application No. 63/171,365, filed on Apr. 6, 2021.

(51) Int. Cl.
*H04W 72/04* (2023.01)
*H04W 72/21* (2023.01)
(Continued)

(52) U.S. Cl.
CPC ........... *H04W 72/21* (2023.01); *H04L 1/1628* (2013.01); *H04L 1/1819* (2013.01); *H04W 72/566* (2023.01)

(58) Field of Classification Search
CPC .. H04W 72/21; H04W 72/566; H04L 1/1628; H04L 1/1819; H04L 1/1671; H04L 1/1861; H04L 1/1854
See application file for complete search history.

(56) References Cited

U.S. PATENT DOCUMENTS

2018/0316464 A1* 11/2018 Stern-Berkowitz ........................ H04L 1/1657
2019/0246416 A1* 8/2019 Park ...................... H04W 72/21
(Continued)

FOREIGN PATENT DOCUMENTS

WO    WO-2022080441 A1 *  4/2022

OTHER PUBLICATIONS

R1-2005872, Intel, Intra-UE multiplexing and prioritization in Release 17 URLLC/IIoT, 3GPP TSG RAN WG1 Meeting #102-E, e-Meeting, Aug. 17-28, 2020 (Year: 2020).*
(Continued)

*Primary Examiner* — Mahbubul Bar Chowdhury
(74) *Attorney, Agent, or Firm* — Harrity & Harrity, LLP

(57) ABSTRACT

Various aspects of the present disclosure generally relate to wireless communication. In some aspects, a user equipment (UE) may multiplex a scheduling request (SR) associated with a first priority and a first physical uplink control channel (PUCCH) format with a hybrid automatic repeat request acknowledgement (HARQ-ACK) associated with a second priority and a second PUCCH format to form a multiplexed SR and HARQ-ACK. The UE may transmit, to a base station, the multiplexed SR and HARQ-ACK using a sequence in a PUCCH format 1 resource, wherein the sequence is based at least in part on whether the SR is a positive value or a negative value. Numerous other aspects are described.

30 Claims, 14 Drawing Sheets

(51) Int. Cl.
  *H04L 1/1607* (2023.01)
  *H04L 1/1812* (2023.01)
  *H04W 72/566* (2023.01)

(56) References Cited

U.S. PATENT DOCUMENTS

| | | | |
|---|---|---|---|
| 2019/0261391 A1* | 8/2019 | Kundu | H04L 1/0073 |
| 2020/0236670 A1* | 7/2020 | Xiong | H04J 13/0074 |
| 2020/0367254 A1* | 11/2020 | Han | H04L 5/0091 |
| 2021/0250134 A1* | 8/2021 | Islam | H04L 1/1819 |
| 2021/0314038 A1* | 10/2021 | Matsumura | H04B 7/0602 |
| 2022/0361199 A1* | 11/2022 | Yin | H04L 27/2605 |
| 2023/0046263 A1* | 2/2023 | Wong | H04W 72/569 |

OTHER PUBLICATIONS

R1-2007055, Moderator (OPPO), Summary#1 on Intra-UE Multiplexing/Prioritization for R17, 3GPP TSG RAN WG1 #102-e, e-Meeting, Aug. 17-28, 2020 (Year: 2020).*

* cited by examiner

MULTIPLEXING A SCHEDULING REQUEST AND A HYBRID AUTOMATIC REPEAT REQUEST ACKNOWLEDGEMENT HAVING DIFFERENT PRIORITIES AND DIFFERENT PHYSICAL UPLINK CONTROL CHANNEL FORMATS

CROSS-REFERENCE TO RELATED APPLICATION

This patent application claims priority to U.S. Provisional Patent Application No. 63/171,365, filed on Apr. 6, 2021, entitled "MULTIPLEXING A SCHEDULING REQUEST AND A HYBRID AUTOMATIC REPEAT REQUEST ACKNOWLEDGEMENT HAVING DIFFERENT PRIORITIES AND DIFFERENT PHYSICAL UPLINK CONTROL CHANNEL FORMATS," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for multiplexing a scheduling request (SR) and a hybrid automatic repeat request acknowledgement (HARQ-ACK) having different priorities and different physical uplink control channel (PUCCH) formats.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes multiplexing a scheduling request (SR) associated with a first priority and a first physical uplink control channel (PUCCH) format with a hybrid automatic repeat request acknowledgement (HARQ-ACK) associated with a second priority and a second PUCCH format to form a multiplexed SR and HARQ-ACK; and transmitting, to a base station, the multiplexed SR and HARQ-ACK using a sequence in a PUCCH format 1 resource, wherein the sequence is based at least in part on whether the SR is a positive value or a negative value.

In some aspects, a method of wireless communication performed by a base station includes transmitting, to a UE, downlink information; and receiving, from the UE and based at least in part on the downlink information, a multiplexed SR and HARQ-ACK in a PUCCH format 1 resource based at least in part on a sequence, wherein the sequence is based at least in part on whether the SR is a positive value or a negative value.

In some aspects, a UE for wireless communication includes a memory and one or more processors, coupled to the memory, configured to: multiplex an SR associated with a first priority and a first PUCCH format with a HARQ-ACK associated with a second priority and a second PUCCH format to form a multiplexed SR and HARQ-ACK; and transmit, to a base station, the multiplexed SR and HARQ-ACK using a sequence in a PUCCH format 1 resource, wherein the sequence is based at least in part on whether the SR is a positive value or a negative value.

In some aspects, a base station for wireless communication includes a memory and one or more processors, coupled to the memory, configured to: transmit, to a UE, downlink information; and receive, from the UE and based at least in part on the downlink information, a multiplexed SR and HARQ-ACK in a PUCCH format 1 resource based at least in part on a sequence, wherein the sequence is based at least in part on whether the SR is a positive value or a negative value.

In some aspects, a non-transitory computer-readable medium storing a set of instructions for wireless communication includes one or more instructions that, when executed by one or more processors of a UE, cause the UE to: multiplex an SR associated with a first priority and a first PUCCH format with a HARQ-ACK associated with a second priority and a second PUCCH format to form a multiplexed SR and HARQ-ACK; and transmit, to a base station, the multiplexed SR and HARQ-ACK using a sequence in a PUCCH format 1 resource, wherein the sequence is based at least in part on whether the SR is a positive value or a negative value.

In some aspects, a non-transitory computer-readable medium storing a set of instructions for wireless communication includes one or more instructions that, when executed by one or more processors of a base station, cause the base station to: transmit, to a UE, downlink information; and receive, from the UE and based at least in part on the downlink information, a multiplexed SR and HARQ-ACK in a PUCCH format 1 resource based at least in part on a sequence, wherein the sequence is based at least in part on whether the SR is a positive value or a negative value.

In some aspects, an apparatus for wireless communication includes means for multiplexing an SR associated with a first priority and a first PUCCH format with a HARQ-ACK associated with a second priority and a second PUCCH format to form a multiplexed SR and HARQ-ACK; and means for transmitting, to a base station, the multiplexed SR and HARQ-ACK using a sequence in a PUCCH format 1 resource, wherein the sequence is based at least in part on whether the SR is a positive value or a negative value.

In some aspects, an apparatus for wireless communication includes means for transmitting, to a UE, downlink information; and means for receiving, from the UE and based at least in part on the downlink information, a multiplexed SR and HARQ-ACK in a PUCCH format 1 resource based at least in part on a sequence, wherein the sequence is based at least in part on whether the SR is a positive value or a negative value.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
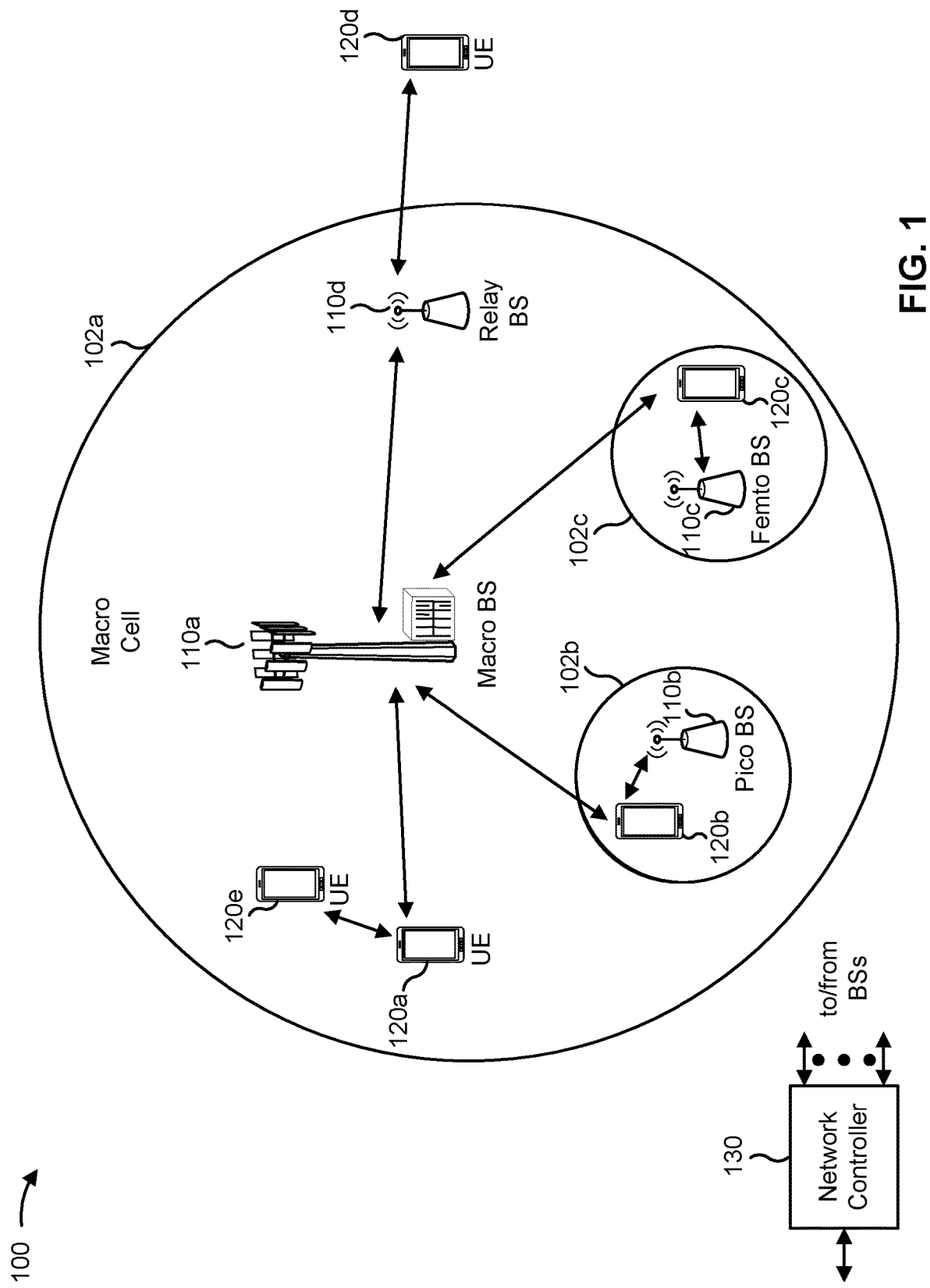
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

As indicated above, FIG. 1 is provided as an example. Other examples may differ from what is described with regard to FIG. 1.

Figure 2:
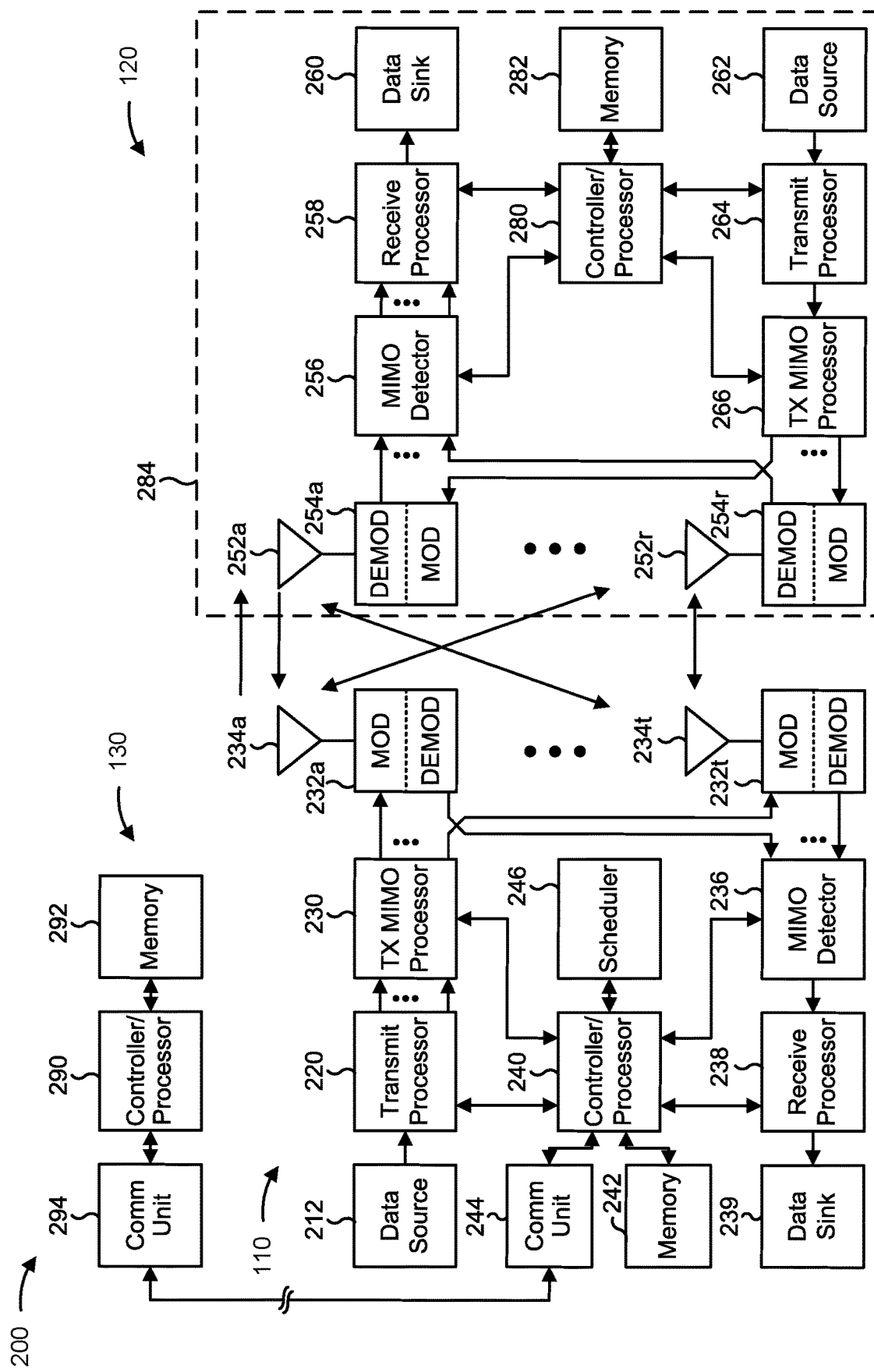
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 8-12).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 8-12).

The controller/processor 240 of the base station 110, the controller/processor 280 of the UE 120, and/or any other component(s) of FIG. 2 may perform one or more techniques associated with multiplexing an SR and a HARQ-ACK having different priorities and different PUCCH formats, as described in more detail elsewhere herein. For example, the controller/processor 240 of the base station 110, the controller/processor 280 of the UE 120, and/or any other component(s) of FIG. 2 may perform or direct operations of, for example, process 1100 of FIG. 11, process 1200 of FIG. 12, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1100 of FIG. 11, process 1200 of FIG. 12, and/or other processes as described herein. In some examples, executing instructions may include running the instructions, converting the instructions, compiling the instructions, and/or interpreting the instructions, among other examples.

In some aspects, a UE (e.g., UE 120) includes means for multiplexing an SR associated with a first priority and a first PUCCH format with a HARQ-ACK associated with a second priority and a second PUCCH format to form a multiplexed SR and HARQ-ACK; and/or means for transmitting, to a base station, the multiplexed SR and HARQ-ACK using a sequence in a PUCCH format 1 resource, wherein the sequence is based at least in part on whether the SR is a positive value or a negative value. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, a base station (e.g., base station 110) includes means for transmitting, to a UE, downlink information; and/or means for receiving, from the UE and based at least in part on the downlink information, a multiplexed SR and HARQ-ACK in a PUCCH format 1 resource based at least in part on a sequence, wherein the sequence is based at least in part on whether the SR is a positive value or a negative value. The means for the base station to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
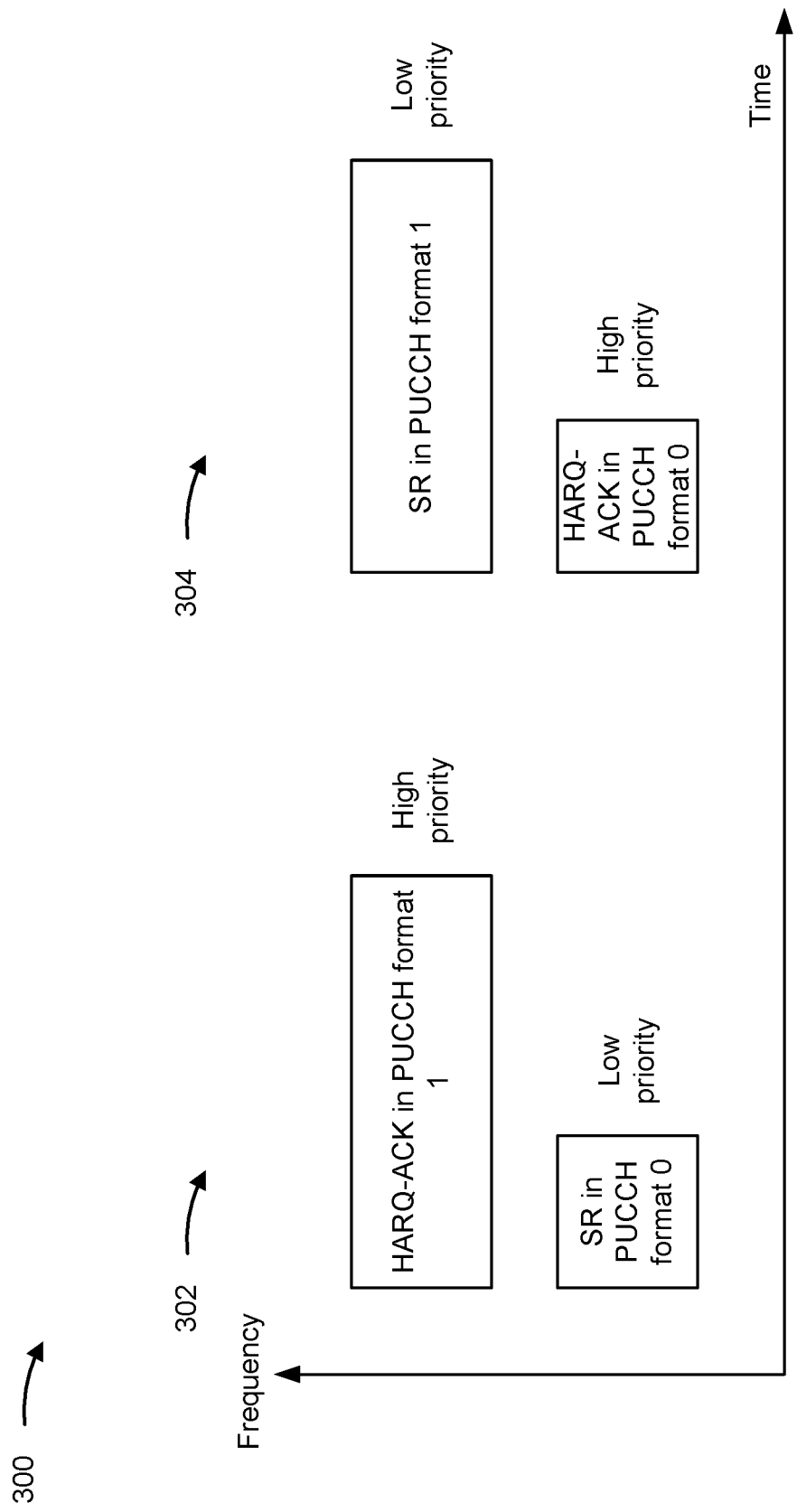
FIG. 3 is a diagram illustrating an example of hybrid automatic repeat request acknowledgement (HARQ-ACK) and scheduling request (SR) transmissions, in accordance with the present disclosure.

FIG. 3 is a diagram illustrating an example 300 of HARQ-ACK and SR transmissions, in accordance with the present disclosure.

As shown by reference number 302, a high priority SR of one bit may be scheduled to be transmitted in a PUCCH format 0. The high priority SR may be associated with a first payload, and may be originally scheduled with the PUCCH format 0. A low priority HARQ-ACK of one bit or two bits may be scheduled to be transmitted in a PUCCH format 1. The low priority HARQ-ACK may be associated with a second payload, and may be originally scheduled with the PUCCH format 1. Different priorities of the SR and the HARQ-ACK may be based at least in part on whether the SR and the HARQ-ACK are associated with ultra-reliable low-latency communications (URLLC) or enhanced mobile broadband (EMBB) communications. In some cases, a PUCCH resource associated with the high priority SR scheduled in the PUCCH format 1 may overlap in a time domain with a PUCCH resource associated with the low priority HARQ-ACK scheduled in the PUCCH format 0.

As shown by reference number 304, a low priority SR of one bit may be scheduled to be transmitted in a PUCCH format 1. The low priority SR may be associated with a first payload, and may be originally scheduled with the PUCCH format 1. A high priority HARQ-ACK of one bit or two bits may be scheduled to be transmitted in a PUCCH format 0. The high priority HARQ-ACK may be associated with a second payload, and may be originally scheduled with the PUCCH format 0. In some cases, a PUCCH resource associated with the low priority SR scheduled in the PUCCH format 1 may overlap in a time domain with a PUCCH resource associated with the high priority HARQ-ACK scheduled in the PUCCH format 0.

As indicated above, FIG. 3 is provided as an example. Other examples may differ from what is described with regard to FIG. 3.

Figure 4:
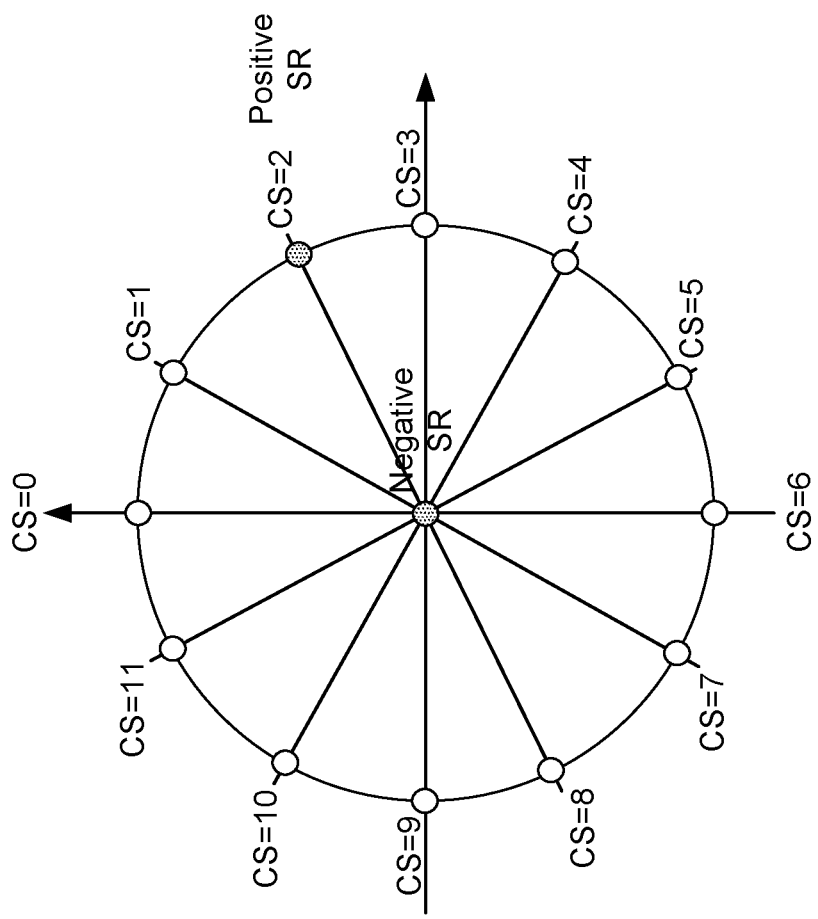
FIG. 4 is a diagram illustrating an example of a cyclic shift associated with an SR transmission, in accordance with the present disclosure.

FIG. 4 is a diagram illustrating an example 400 of a cyclic shift associated with an SR transmission, in accordance with the present disclosure.

As shown in FIG. 4, a UE may use a cyclic shift index (e.g., a cyclic shift index of two) to transmit a one-bit SR to a base station. The UE may transmit the SR on a PUCCH format 0 by transmitting a base sequence S in a resource block with a certain amount of cyclic shift in a time domain. A total of twelve cyclic shift indexes may be defined, and the cyclic shift indexes may range from 0 to 11. The base station may configure the UE, via radio resource control (RRC) signaling, to use a cyclic shift index i to transmit a positive SR. When the SR is negative, the UE may not transmit the SR to the base station.

As indicated above, FIG. 4 is provided as an example. Other examples may differ from what is described with regard to FIG. 4.

One or two HARQ-ACK information bits of a same priority may be transmitted on a PUCCH format 0. The one or two HARQ-ACK information bits of the same priority may be transmitted based at least in part on transmitting a sequence S in one resource block with a certain amount of cyclic shift in a time domain. A cyclic shift index may be selected from a total of twelve possible cyclic shift indexes, which may range from 0 to 11.

Figure 5:
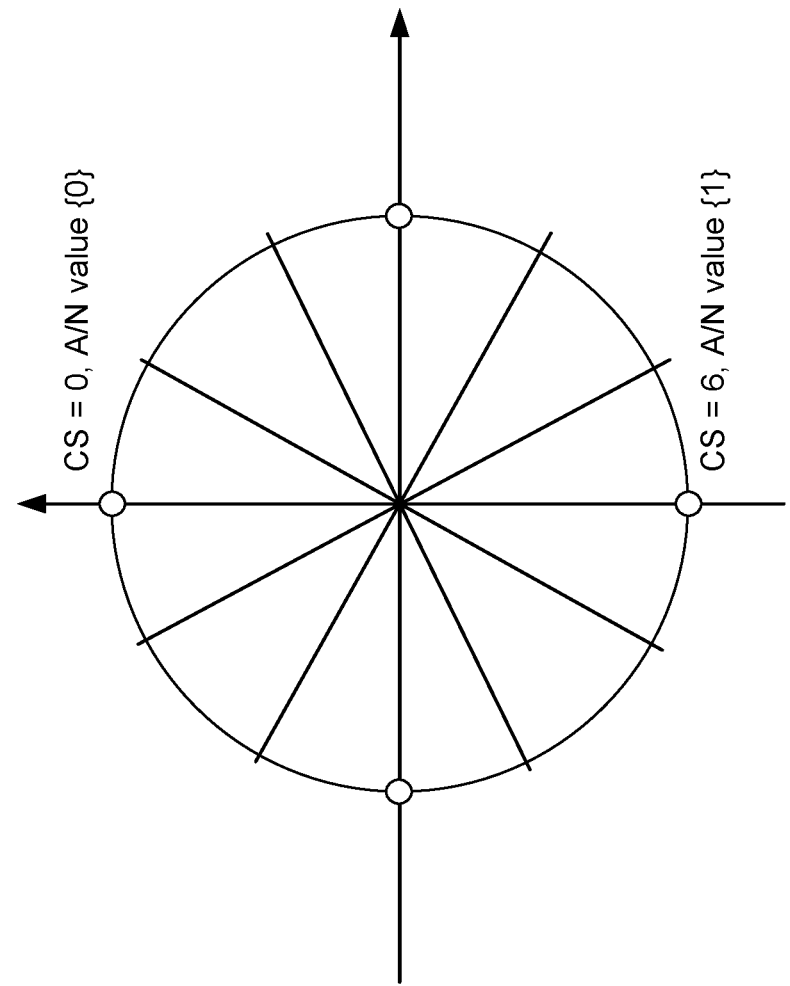
FIG. 5 is a diagram illustrating an example of a mapping of values for one HARQ-ACK information bit to sequences for a physical uplink control channel (PUCCH) format 0, in accordance with the present disclosure.

FIG. 5 is a diagram illustrating an example 500 of a mapping of values for one HARQ-ACK information bit to sequences for a PUCCH format 0, in accordance with the present disclosure.

As shown in FIG. 5, when a one-bit HARQ-ACK value is equal to {0}, a cyclic shift index applied to a sequence may be equal to 0. When the one-bit HARQ-ACK value is equal to {1}, the cyclic shift index applied to the sequence may be equal to 6.

As indicated above, FIG. 5 is provided as an example. Other examples may differ from what is described with regard to FIG. 5.

Figure 6:
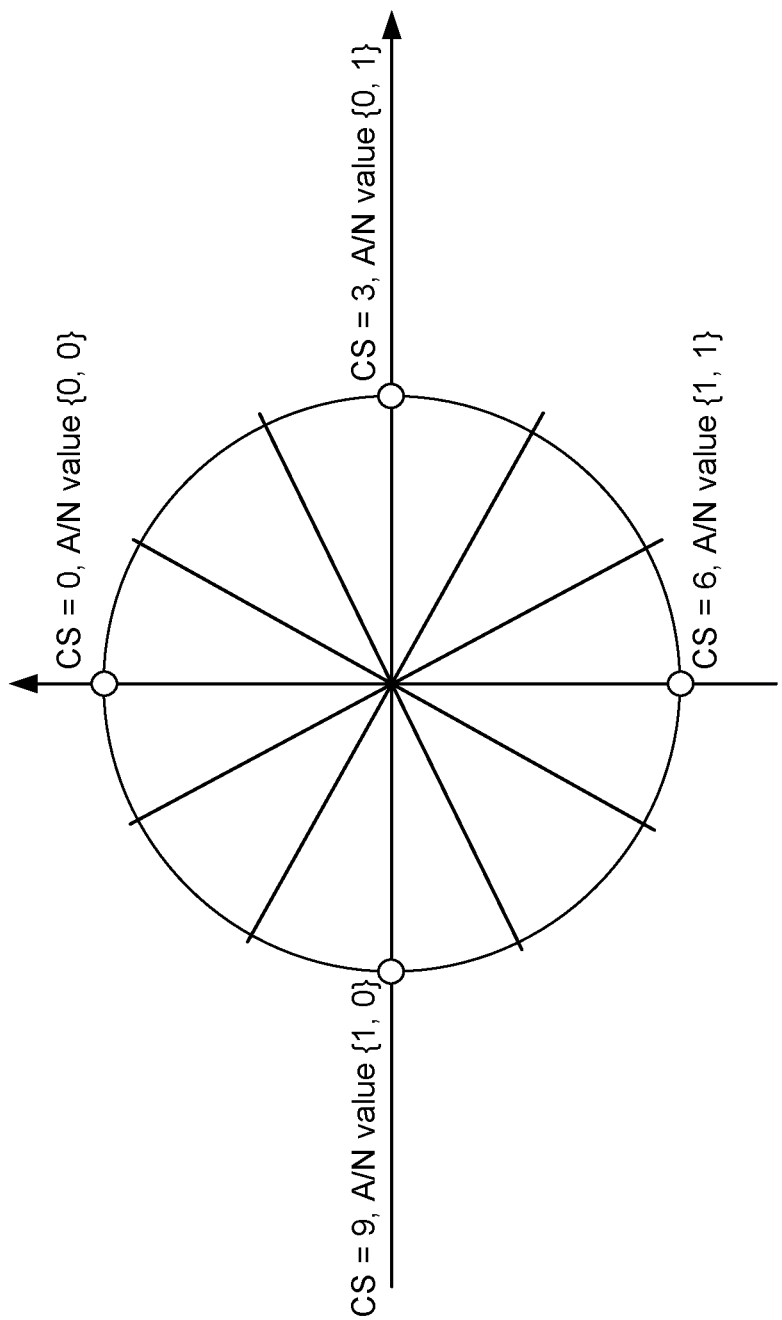
FIG. 6 is a diagram illustrating an example of a mapping of values for two HARQ-ACK information bits to sequences for a PUCCH format 0, in accordance with the present disclosure.

FIG. 6 is a diagram illustrating an example 600 of a mapping of values for two HARQ-ACK information bits to sequences for a PUCCH format 0, in accordance with the present disclosure.

As shown in FIG. 6, when a two-bit HARQ-ACK value is equal to {0,0} (e.g., a first HARQ-ACK bit is equal to {0}, and a second HARQ-ACK bit is equal to {1}), a cyclic shift index applied to a sequence may be equal to 0. When the two-bit HARQ-ACK value is equal to {0,1} (e.g., the first HARQ-ACK bit is equal to {0}, and the second HARQ-ACK bit is equal to {1}), the cyclic shift index applied to the sequence may be equal to 3. When the two-bit HARQ-ACK value is equal to {1,1} (e.g., the first HARQ-ACK bit is equal to {1}, and the second HARQ-ACK bit is equal to {1}), the cyclic shift index applied to the sequence may be equal to 6. When the two-bit HARQ-ACK value is equal to {1,0} (e.g., the first HARQ-ACK bit is equal to {1}, and the second HARQ-ACK bit is equal to {0}), the cyclic shift index applied to the sequence may be equal to 9.

Depending on the two-bit HARQ-ACK value, the cyclic shift index applied to the sequence may be equal to 0, 3, 6, or 9. Distances between some pairs of cyclic shift indexes may be equal to each other. For example, a distance between the cyclic shift index equal to 0 and the cyclic shift index equal to 3 is three, a distance between the cyclic shift index equal to 3 and the cyclic shift index equal to 6 is three, and so on. The distance between cyclic shift indexes may also refer to a difference between cyclic shift indexes. For example, both a distance and a difference between the cyclic shift index equal to 0 and the cyclic shift index equal to 3 is three.

As indicated above, FIG. 6 is provided as an example. Other examples may differ from what is described with regard to FIG. 6.

Figure 7:
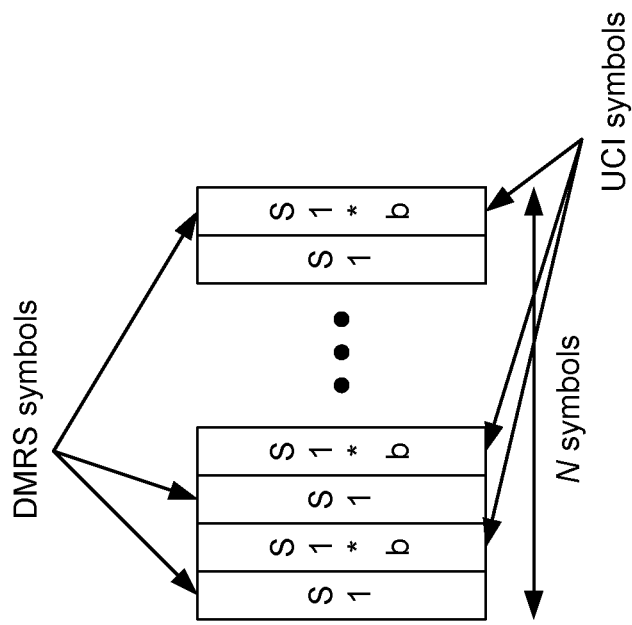
FIG. 7 is a diagram illustrating an example of a transmission in a PUCCH format 1, in accordance with the present disclosure.

FIG. 7 is a diagram illustrating an example 700 of a transmission in a PUCCH format 1, in accordance with the present disclosure.

As shown in FIG. 7, a UE may transmit, to a base station, a payload carrying uplink control information (UCI) via a PUCCH format 1. The UCI may be HARQ-ACK feedback. The payload may include one HARQ-ACK bit or two HARQ-ACK bits. The payload may range from 4 to 14 symbols (e.g., OFDM symbols). For a given cell-specific base sequence S (e.g., a base sequence with a length of 12 symbols), the UE may transmit the payload by transmitting a sequence S1, which may be the base sequence S with a cyclic shift amount or index. The UE may transmit the sequence S1 as a demodulation reference signal (DMRS) on even symbols in a plurality of symbols (e.g., N symbols). The UE may transmit the sequence S1 modulated by the payload on odd symbols in the plurality of symbols. The odd symbols in the plurality of symbols may correspond to the UCI, such as the HARQ-ACK feedback, which may include the one HARQ-ACK bit or the two HARQ-ACK bits.

The UE may use binary phase-shift keying (BPSK) modulation when the payload is one bit. With a one-bit payload, generated waveforms for the two hypotheses {0} and {1} are orthogonal. The UE may use quadrature phase shift keying (QPSK) modulation when the payload is two bits. With a two-bit payload, generated waveforms for the four hypotheses {0,0}, {0,1}, {1,0} and {1,1} are not orthogonal.

As indicated above, FIG. 7 is provided as an example. Other examples may differ from what is described with regard to FIG. 7.

A UE may multiplex a first payload associated with an SR and a second payload associated with a HARQ-ACK to form a multiplexed SR and HARQ-ACK, which may be transmitted to a base station. However, the UE may not be configured to multiplex a HARQ-ACK and an SR with different priorities and with different PUCCH formats. When the HARQ-ACK is associated with a high priority and the SR is associated with a low priority, or vice versa, the UE may not be configured to multiplex the HARQ-ACK and the SR. Further, when the HARQ-ACK is associated with a PUCCH format 0 and the SR is associated with a PUCCH format 1, or vice versa, the UE may not be configured to multiplex the HARQ-ACK and the SR. The UE may not be configured to determine which PUCCH format to use when combining the HARQ-ACK and the SR having the different priorities and the different PUCCH formats.

In various aspects of techniques and apparatuses described herein, a UE may multiplex an SR associated with a first priority and a first PUCCH format with a HARQ-ACK associated with a second priority and a second PUCCH format to form a multiplexed SR and HARQ-ACK. The first priority associated with the SR may be greater than the second priority associated with the HARQ-ACK, or alternatively, the second priority associated with the HARQ-ACK may be greater than the first priority associated with the SR. The first PUCCH format associated with the SR may be a PUCCH format 0 and the second PUCCH format associated with the HARQ-ACK may be a PUCCH format 1, or alternatively, the first PUCCH format associated with the SR may be a PUCCH format 1 and the second PUCCH format associated with the HARQ-ACK may be a PUCCH format 0. In some aspects, the UE may transmit, to a base station, the multiplexed SR and HARQ-ACK using a sequence in the PUCCH format 1 resource. In some aspects, the sequence may be based at least in part on whether the SR is a positive value or a negative value. For example, the sequence may be a first sequence when the SR is the positive value, or the sequence may be a second sequence when the SR is the negative value. In some aspects, the first sequence may be a base sequence with a first cyclic shift index, or the second sequence may be a base sequence with a second cyclic shift index, where the first cyclic shift index and the second cyclic shift index may be separated by a maximum available distance (e.g., a distance of six).

In some aspects, instead of using a single sequence, an additional sequence may be available for transmitting the multiplexed SR and HARQ-ACK. One of two sequences may be selected depending on a sign (e.g., positive or negative) of an SR in the multiplexed SR and HARQ-ACK. The two sequences may enable the multiplexed SR and HARQ-ACK of up to three bits to be transmitted, since one of the two sequences may be associated with the positive SR and the other sequence may be associated with the negative SR. As a result, when a resource associated with an SR overlaps in time with a resource associated with a HARQ-ACK, the UE may be configured to multiplex an SR and a HARQ-ACK having different priorities and different PUCCH formats, and transmit the multiplexed SR and HARQ-ACK using the sequence that is based at least in part on whether the SR is the positive value or the negative value.

Figure 8:
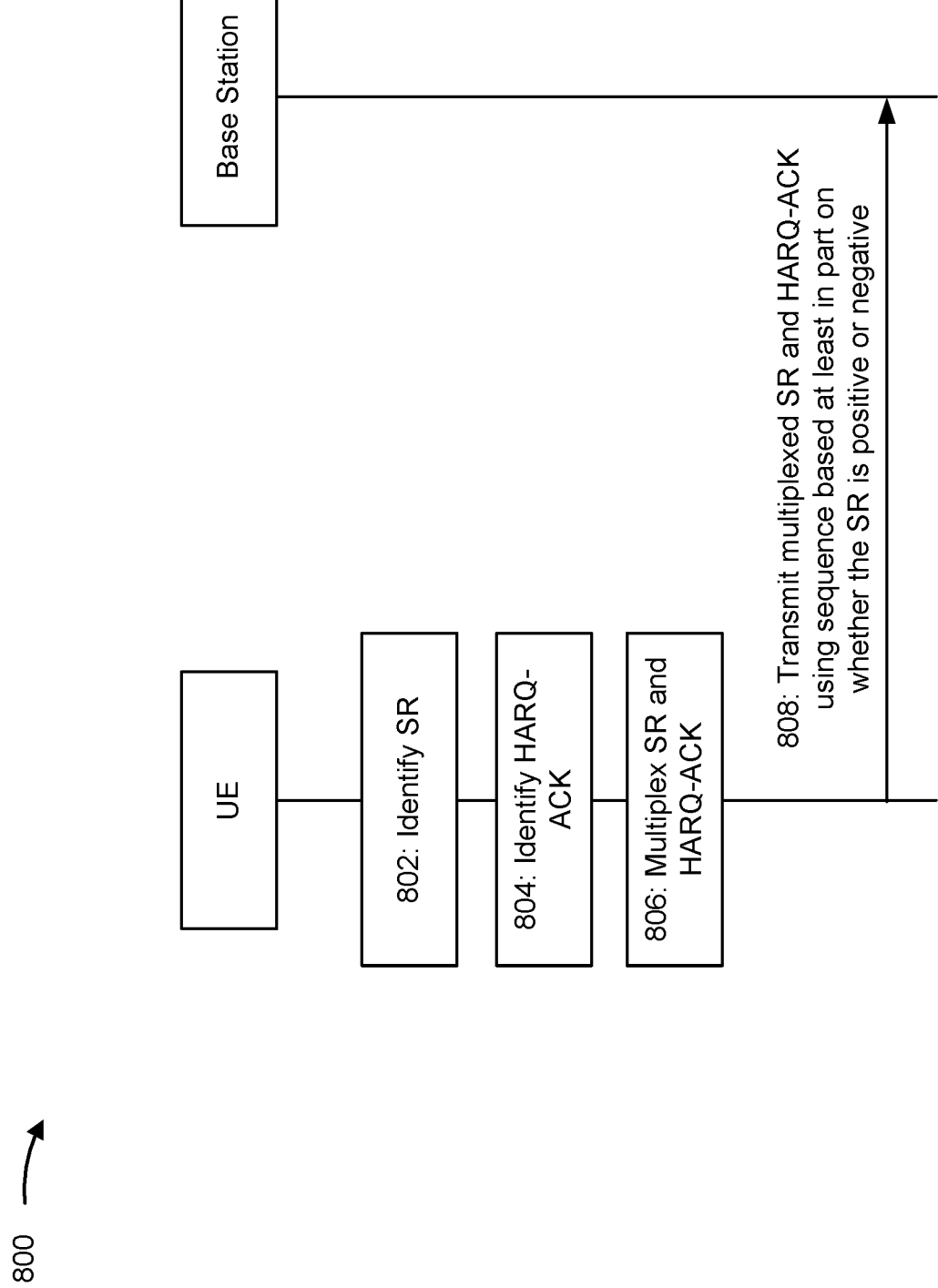
FIGS. 8-10 are diagrams illustrating examples associated with multiplexing an SR and a HARQ-ACK having different priorities and different PUCCH formats, in accordance with the present disclosure.

FIG. 8 is a diagram illustrating an example 800 associated with multiplexing an SR and a HARQ-ACK having different priorities and different PUCCH formats, in accordance with the present disclosure. As shown in FIG. 8, example 800 includes communication between a UE (e.g., UE 120) and a base station (e.g., base station 110). In some aspects, the UE and the base station may be included in a wireless network such as wireless network 100.

As shown by reference number 802, the UE may identify an SR. The SR may be associated with a first priority and a first PUCCH format. For example, the SR may be associated with a high priority or a low priority. The SR may be associated with a PUCCH format 0 or a PUCCH format 1. The SR may be one bit.

As shown by reference number 804, the UE may identify a HARQ-ACK. The HARQ-ACK may be associated with a second priority and a second PUCCH format. For example, the HARQ-ACK may be associated with a low priority or a high priority. The HARQ-ACK may be associated with a PUCCH format 1 or a PUCCH format 0. The HARQ-ACK may be one bit or two bits.

In some aspects, the SR may be associated with the first priority and the HARQ-ACK may be associated with the second priority. In some aspects, the first priority may be greater than the second priority. Alternatively, the second priority may be greater than the first priority. For example, the SR may be associated with a high priority and the HARQ-ACK may be associated with a low priority. Alternatively, the SR may be associated with a low priority and the HARQ-ACK may be associated with a high priority.

In some aspects, the SR may be associated with the first PUCCH format and the HARQ-ACK may be associated with the second PUCCH format. For example, the SR may be associated with a PUCCH format 0 and the HARQ-ACK may be associated with a PUCCH format 1. Alternatively, the SR may be associated with a PUCCH format 1 and the HARQ-ACK may be associated with a PUCCH format 0.

In some aspects, the UE may determine that a resource associated with the SR overlaps in a time domain with a resource associated with the HARQ-ACK. For example, the UE may determine that a PUCCH format resource associated with the SR may overlap in the time domain with a PUCCH format resource associated with the HARQ-ACK. A PUCCH format 1 resource associated with the SR may overlap in the time domain with a PUCCH format 0 resource associated with the HARQ-ACK, or a PUCCH format 0 resource associated with the SR may overlap in the time domain with a PUCCH format 1 resource associated with the HARQ-ACK.

As shown by reference number 806, the UE may multiplex the SR associated with the first priority and the first PUCCH format with the HARQ-ACK associated with the second priority and the second PUCCH format to form a multiplexed SR and HARQ-ACK. The UE may multiplex the SR with the HARQ-ACK based at least in part on the PUCCH format resource associated with the SR overlapping in the time domain with the PUCCH format resource associated with the HARQ-ACK. The multiplexed SR and HARQ-ACK may be up to three bits. For example, the multiplexed SR and HARQ-ACK may be three bits when the SR is one bit and the HARQ-ACK is two bits, or the multiplexed SR and HARQ-ACK may be two bits when the SR is one bit and the HARQ-ACK is one bit.

As shown by reference number 808, the UE may transmit, to the base station, the multiplexed SR and HARQ-ACK using a sequence in the PUCCH format 1 resource. The UE may transmit the multiplexed SR and HARQ-ACK in the PUCCH format 1 as opposed to the PUCCH format 0, since the PUCCH format 1 may have a greater quantity of symbols that utilize more energy and yield an improved performance as compared to the PUCCH format 0. The sequence may be based at least in part on whether the SR is a positive value or a negative value. For example, the sequence may be a first sequence when the SR is the positive value, or the sequence may be a second sequence when the SR is the negative value. In other words, the UE may select the sequence based at least in part on a sign (e.g., positive or negative) of the SR. As an example, the first sequence and the second sequence may be length 12 sequences, which may be computer generated sequences (CGS).

In some aspects, when the SR is the positive value, the UE may transmit the multiplexed SR and HARQ-ACK in the PUCCH format 1 resource based at least in part on the first sequence. In some aspects, when the SR is the negative value, the UE may transmit the multiplexed SR and HARQ-ACK in the PUCCH format 1 resource based at least in part on the second sequence. The first sequence may be associated with the positive SR and the second sequence may be associated with the negative SR, or alternatively, the first sequence may be associated with the negative SR and the second sequence may be associated with the positive SR.

In some aspects, the first sequence may be a base sequence with a first cyclic shift index. The second sequence may be a base sequence with a second cyclic shift index. The first cyclic shift index and the second cyclic shift index may be separated by a maximum available distance (or gap or offset). The maximum available distance between cyclic shift indexes may be equal to a total sequence length divided by two. For example, twelve cyclic shift indexes may be available, and the first cyclic shift index and the second cyclic shift index may be separated by a maximum available distance of six. For example, the first cyclic shift index may be 0 and the second cyclic shift index may be 6, the first cyclic shift index may be 1 and the second cyclic shift index may be 7, and so on.

In some aspects, the UE may receive, from the base station, an indication of the first cyclic shift index. The UE may determine the second cyclic shift index based at least in part on the first cyclic shift index and a maximum available distance between the first cyclic shift index and the second cyclic shift index. For example, the UE may determine the second cyclic shift index in accordance with CS2=mod (CS1+6,12), where CS2 is the second cyclic shift index, CS1 is the first cyclic shift index, the 6 is based at least in part on the maximum available distance, and the 12 is based at least in part on a maximum quantity of possible cyclic shift indexes. In some aspects, the UE may receive the indication of the first cyclic shift index via RRC signaling, downlink control information (DCI), or a medium access control control element (MAC-CE). In some aspects, the UE may receive, from the base station, an indication of both the first cyclic shift index and the second cyclic shift index. The UE may receive the indication via RRC signaling, DCI, or a MAC-CE.

As indicated above, FIG. 8 is provided as an example. Other examples may differ from what is described with regard to FIG. 8.

Figure 9:
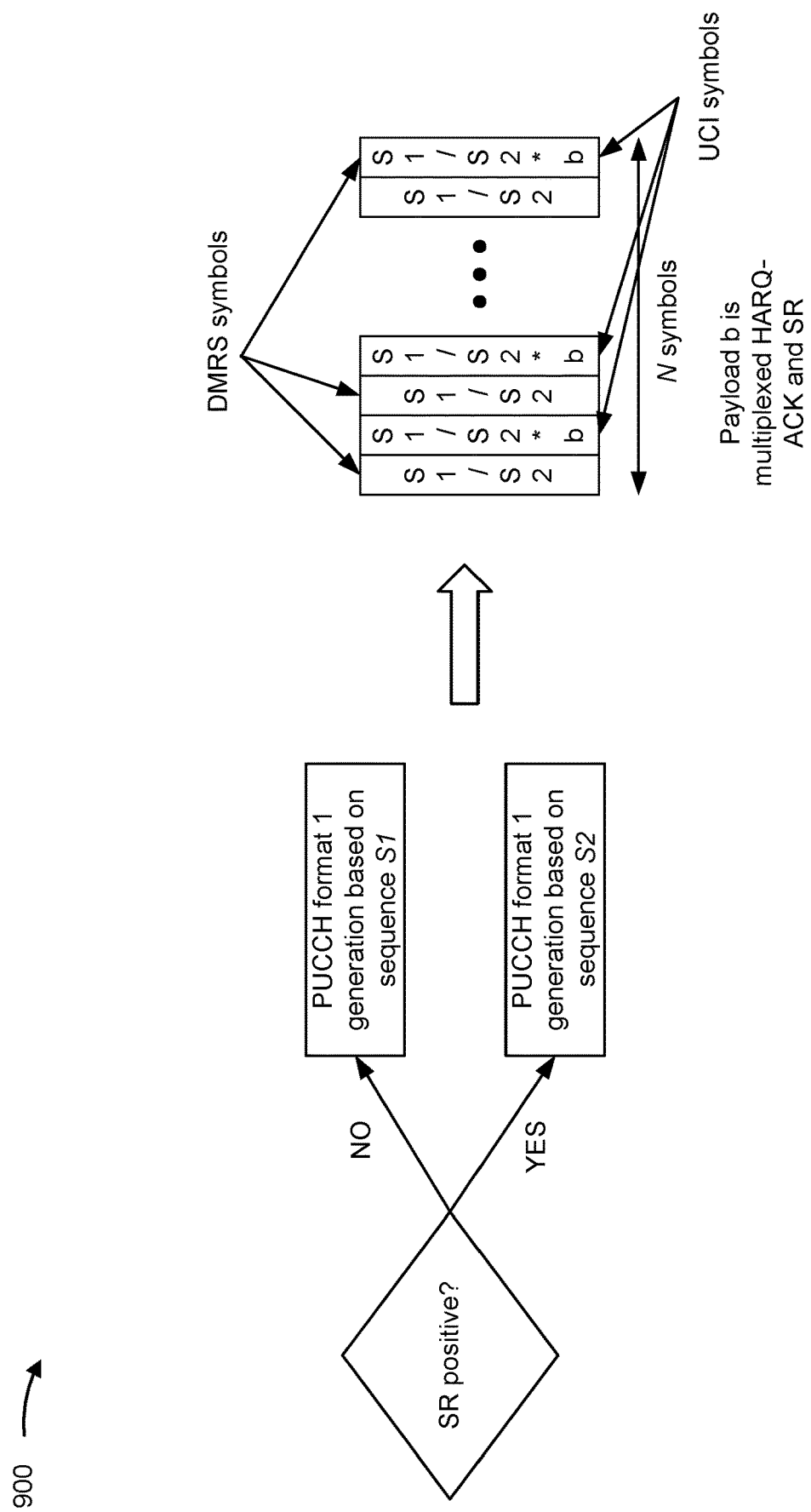

FIG. 9 is a diagram illustrating an example 900 associated with multiplexing an SR and a HARQ-ACK having different priorities and different PUCCH formats, in accordance with the present disclosure.

As shown in FIG. 9, a UE may determine whether an SR in a multiplexed SR and HARQ-ACK is a positive SR or a negative SR. When the SR is the positive SR, the UE may perform a PUCCH format 1 generation based at least in part on a first sequence (S1). The first sequence may be associated with the positive SR. When the SR is the negative SR, the UE may perform a PUCCH format 1 generation based at least in part on a second sequence (S2). The second sequence may be associated with the negative SR. In some aspects, the UE may transmit the SR (e.g., a one-bit SR) based at least in part on a sequence selection, where the UE may use the first sequence for the positive SR or the second sequence for the negative SR. In some aspects, the UE may transmit the HARQ-ACK (e.g., a one bit HARQ-ACK or a two bit HARQ-ACK) based at least in part on a PUCCH format 1 waveform generation, where the sequence used to transmit the HARQ-ACK may be the first sequence or the second sequence, depending on whether the SR is positive or negative. In other words, the UE may transmit the SR and the HARQ-ACK using either the first sequence or the second sequence, depending on whether the SR is positive or negative. In some aspects, the first sequence may be associated with the negative SR, and the second sequence may be associated with the negative SR.

In some aspects, the UE may transmit, to a base station, a payload carrying UCI via a PUCCH format 1. The UCI may be a multiplexed SR and HARQ-ACK that is up to three bits. The UE may transmit the payload by transmitting the first sequence S1 when the SR is the positive value, or the UE may transmit the payload by transmitting the second sequence S2 when the SR is the negative value. The first sequence S1 may be a base sequence S with a first cyclic shift index, and the second sequence S2 may be a base sequence S with a second cyclic shift index. The UE may transmit the sequence S1 or the sequence S2 as a DMRS on even symbols in a plurality of symbols (e.g., N symbols). The UE may transmit the sequence S1 or the sequence S2 modulated by the payload on odd symbols in the plurality of symbols. The odd symbols in the plurality of symbols may correspond to the UCI, which may include the multiplexed SR and HARQ-ACK that is up to three bits.

As indicated above, FIG. 9 is provided as an example. Other examples may differ from what is described with regard to FIG. 9.

Figure 10:
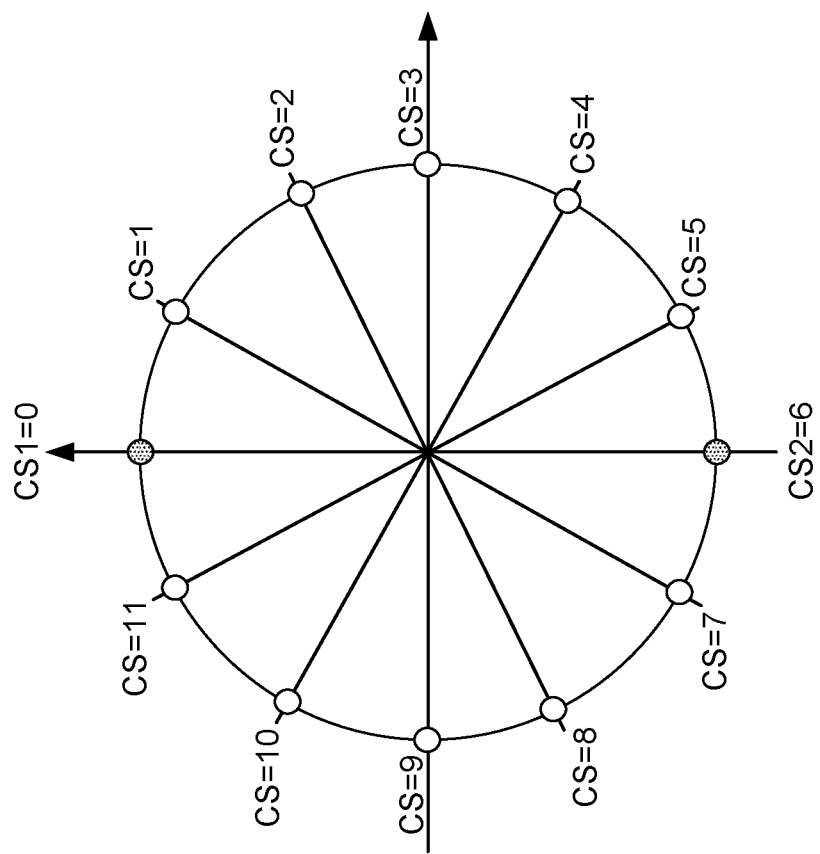

FIG. 10 is a diagram illustrating an example 1000 associated with multiplexing an SR and a HARQ-ACK having different priorities and different PUCCH formats, in accordance with the present disclosure.

As shown in FIG. 10, a first cyclic shift index (e.g., a cyclic shift index of 0) may be associated with a first sequence S1 and a second cyclic shift index (e.g., a cyclic shift index of 6) may be associated with a second sequence S2. The first sequence S1 may be a sequence S with the first cyclic shift index, and the second sequence S2 may be a sequence S with the second cyclic shift index. The first cyclic shift index and the second cyclic shift index may be separated by a maximum available distance (or gap or offset), which may optimize a performance when transmitting a multiplexed SR and HARQ-ACK using the first sequence or the second sequence. The maximum available distance is six when a total of twelve possible cyclic shift indexes are available.

As indicated above, FIG. 10 is provided as an example. Other examples may differ from what is described with regard to FIG. 10.

Figure 11:
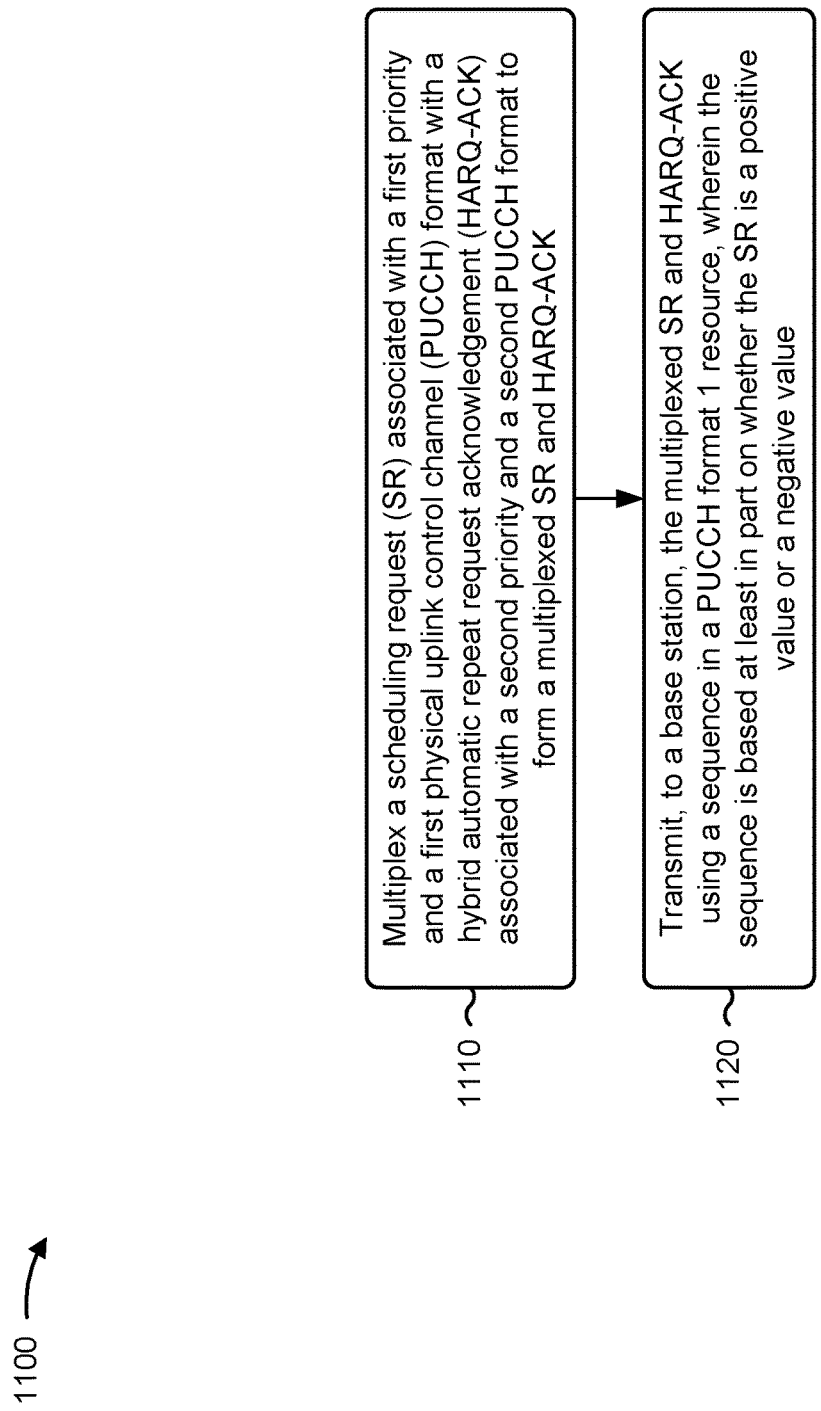
FIGS. 11-12 are diagrams illustrating example processes associated with multiplexing an SR and a HARQ-ACK having different priorities and different PUCCH formats, in accordance with the present disclosure.

FIG. 11 is a diagram illustrating an example process 1100 performed, for example, by a UE, in accordance with the present disclosure. Example process 1100 is an example where the UE (e.g., UE 120) performs operations associated with multiplexing an SR and a HARQ-ACK having different priorities and different PUCCH formats.

As shown in FIG. 11, in some aspects, process 1100 may include multiplexing an SR associated with a first priority and a first PUCCH format with a HARQ-ACK associated with a second priority and a second PUCCH format to form a multiplexed SR and HARQ-ACK (block 1110). For example, the UE may multiplex (e.g., e.g., using controller/processor 280) an SR associated with a first priority and a first PUCCH format with a HARQ-ACK associated with a second priority and a second PUCCH format to form a multiplexed SR and HARQ-ACK, as described above.

As further shown in FIG. 11, in some aspects, process 1100 may include transmitting, to a base station, the multiplexed SR and HARQ-ACK using a sequence in a PUCCH format 1 resource, wherein the sequence is based at least in part on whether the SR is a positive value or a negative value (block 1120). For example, the UE may transmit (e.g., using controller/processor 280, transmit processor 264, TX MIMO processor 266, MOD 254, and/or antenna 252), to a base station, the multiplexed SR and HARQ-ACK using a sequence in a PUCCH format 1 resource, wherein the sequence is based at least in part on whether the SR is a positive value or a negative value, as described above.

Process 1100 may include additional aspects, such as any single aspect or any combination of aspects described below and/or in connection with one or more other processes described elsewhere herein.

In a first aspect, process 1100 includes the sequence is a first sequence when the SR is the positive value, or the sequence is a second sequence when the SR is the negative value.

In a second aspect, alone or in combination with the first aspect, multiplexing the SR with the HARQ-ACK is based at least in part on a PUCCH format resource associated with the SR overlapping in a time domain with a PUCCH format resource associated with the HARQ-ACK.

In a third aspect, alone or in combination with one or more of the first and second aspects, the first priority associated with the SR is greater than the second priority associated with the HARQ-ACK.

In a fourth aspect, alone or in combination with one or more of the first through third aspects, the second priority associated with the HARQ-ACK is greater than the first priority associated with the SR.

In a fifth aspect, alone or in combination with one or more of the first through fourth aspects, the first PUCCH format associated with the SR is a PUCCH format 0 and the second PUCCH format associated with the HARQ-ACK is the PUCCH format 1.

In a sixth aspect, alone or in combination with one or more of the first through fifth aspects, the first PUCCH format associated with the SR is a PUCCH format 1 and the second PUCCH format associated with the HARQ-ACK is the PUCCH format 0.

In a seventh aspect, alone or in combination with one or more of the first through sixth aspects, the SR is one bit, and the HARQ-ACK is one bit or two bits.

In an eighth aspect, alone or in combination with one or more of the first through seventh aspects, the first sequence is a base sequence with a first cyclic shift index, or the second sequence is a base sequence with a second cyclic shift index.

In a ninth aspect, alone or in combination with one or more of the first through eighth aspects, the first cyclic shift index and the second cyclic shift index are separated by a maximum available distance, and wherein the maximum available distance is equal to six.

In a tenth aspect, alone or in combination with one or more of the first through ninth aspects, process 1100 includes receiving, from the base station, an indication of the first cyclic shift index, and determining the second cyclic shift index based at least in part on the first cyclic shift index and a maximum available distance between the first cyclic shift index and the second cyclic shift index.

In an eleventh aspect, alone or in combination with one or more of the first through tenth aspects, receiving the indication of the first cyclic shift index comprises receiving the indication via RRC signaling, DCI, or a MAC-CE.

In a twelfth aspect, alone or in combination with one or more of the first through eleventh aspects, process 1100 includes receiving, from the base station, an indication of the first cyclic shift index and the second cyclic shift index.

In a thirteenth aspect, alone or in combination with one or more of the first through twelfth aspects, receiving the indication of the first cyclic shift index and the second cyclic shift index comprises receiving the indication via RRC signaling, DCI, or a MAC-CE.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
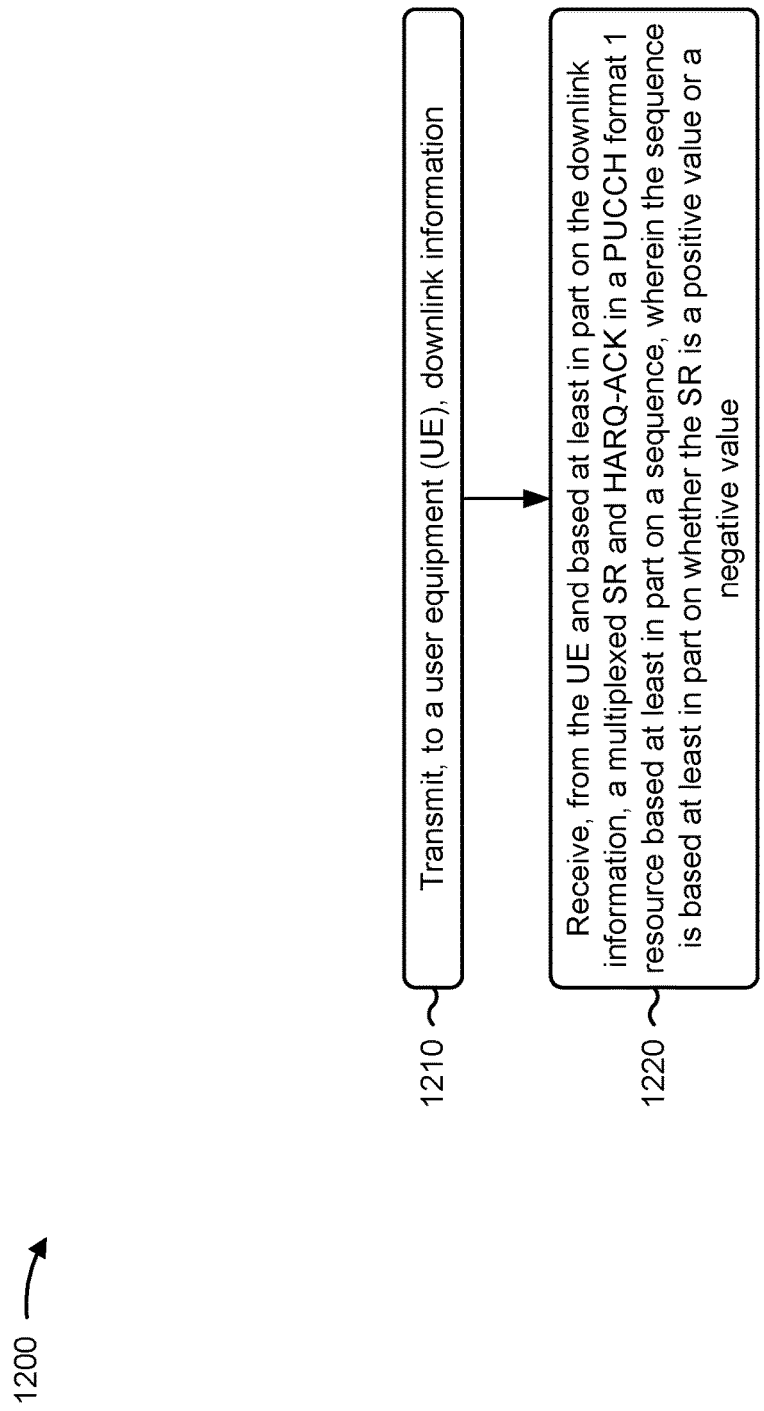

FIG. 12 is a diagram illustrating an example process 1200 performed, for example, by a base station, in accordance with the present disclosure. Example process 1200 is an example where the base station (e.g., base station 110) performs operations associated with multiplexing an SR and a HARQ-ACK having different priorities and different PUCCH formats.

As shown in FIG. 12, in some aspects, process 1200 may include transmitting, to a UE, downlink information (block 1210). For example, the base station may transmit (e.g., using controller/processor 240, transmit processor 220, TX MIMO processor 230, MOD 232, and/or antenna 234), to a UE, downlink information, as described above.

As further shown in FIG. 12, in some aspects, process 1200 may include receiving, from the UE and based at least in part on the downlink information, a multiplexed SR and HARQ-ACK in a PUCCH format 1 resource based at least in part on a sequence, wherein the sequence is based at least in part on whether the SR is a positive value or a negative value (block 1220). For example, the base station may receive (e.g., using antenna 234, DEMOD 232, MIMO detector 236, receive processor 238, and/or controller/processor 240), from the UE and based at least in part on the downlink information, a multiplexed SR and HARQ-ACK in a PUCCH format 1 resource based at least in part on a sequence, wherein the sequence is based at least in part on whether the SR is a positive value or a negative value, as described above.

Process 1200 may include additional aspects, such as any single aspect or any combination of aspects described below and/or in connection with one or more other processes described elsewhere herein.

In a first aspect, the SR is associated with a first priority and the HARQ-ACK is associated with a second priority that is higher than the first priority.

In a second aspect, alone or in combination with the first aspect, the HARQ-ACK is associated with a first priority and the SR is associated with a second priority that is higher than the first priority.

In a third aspect, alone or in combination with one or more of the first and second aspects, the SR is associated with a first PUCCH format and the HARQ-ACK is associated with a second PUCCH format.

In a fourth aspect, alone or in combination with one or more of the first through third aspects, the first PUCCH format is a PUCCH format 0 and the second PUCCH format is the PUCCH format 1.

In a fifth aspect, alone or in combination with one or more of the first through fourth aspects, the first PUCCH format is the PUCCH format 1 and the second PUCCH format is a PUCCH format 0.

In a sixth aspect, alone or in combination with one or more of the first through fifth aspects, the SR is multiplexed with the HARQ-ACK based at least in part on a PUCCH format resource associated with the SR overlapping in a time domain with a PUCCH format resource associated with the HARQ-ACK.

In a seventh aspect, alone or in combination with one or more of the first through sixth aspects, the SR is one bit, and the HARQ-ACK is one bit or two bits.

In an eighth aspect, alone or in combination with one or more of the first through seventh aspects, the sequence is a first sequence when the SR is the positive value, or the sequence is a second sequence when the SR is the negative value.

In a ninth aspect, alone or in combination with one or more of the first through eighth aspects, the first sequence is a base sequence with a first cyclic shift index, or the second sequence is a base sequence with a second cyclic shift index.

In a tenth aspect, alone or in combination with one or more of the first through ninth aspects, the first cyclic shift index and the second cyclic shift index are separated by a maximum available distance, and wherein the maximum available distance is equal to six.

In an eleventh aspect, alone or in combination with one or more of the first through tenth aspects, process 1200 includes transmitting, to the UE, an indication of the first cyclic shift index, wherein the second cyclic shift index is based at least in part on the first cyclic shift index and a maximum available distance between the first cyclic shift index and the second cyclic shift index.

In a twelfth aspect, alone or in combination with one or more of the first through eleventh aspects, transmitting the indication of the first cyclic shift index comprises transmitting the indication via RRC signaling, DCI, or a MAC-CE.

In a thirteenth aspect, alone or in combination with one or more of the first through twelfth aspects, process 1200 includes transmitting, to the UE, an indication of the first cyclic shift index and the second cyclic shift index.

In a fourteenth aspect, alone or in combination with one or more of the first through thirteenth aspects, transmitting the indication of the first cyclic shift index and the second cyclic shift index comprises transmitting the indication via RRC signaling, DCI, or a MAC-CE.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
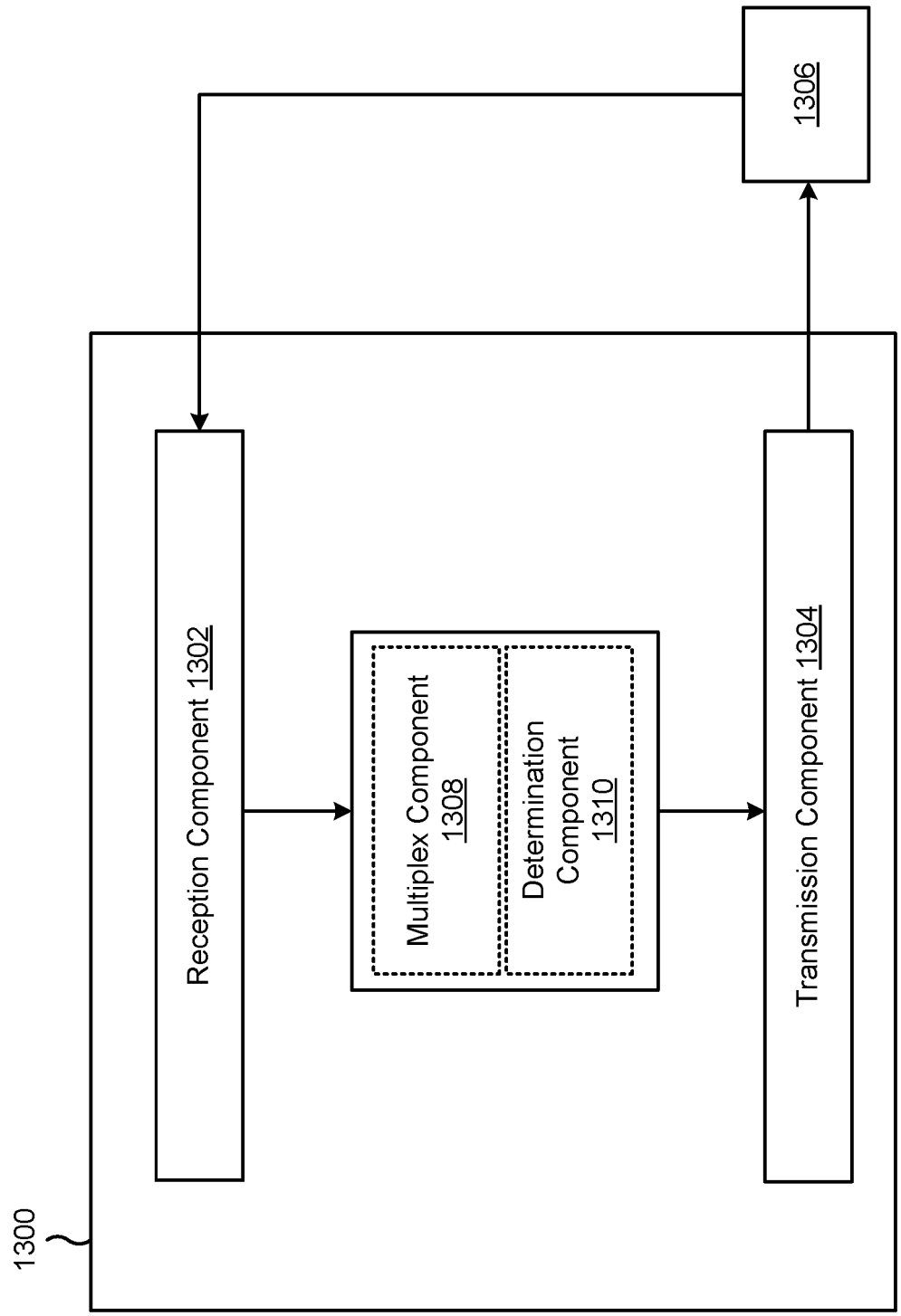
FIGS. 13-14 are block diagrams of example apparatuses for wireless communication, in accordance with the present disclosure.

FIG. 13 is a block diagram of an example apparatus 1300 for wireless communication. The apparatus 1300 may be a UE, or a UE may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304. As further shown, the apparatus 1300 may include one or more of a multiplex component 1308, or a determination component 1310, among other examples.

In some aspects, the apparatus 1300 may be configured to perform one or more operations described herein in connection with FIGS. 8-10. Additionally, or alternatively, the apparatus 1300 may be configured to perform one or more processes described herein, such as process 1100 of FIG. 11. In some aspects, the apparatus 1300 and/or one or more components shown in FIG. 13 may include one or more components of the UE described above in connection with FIG. 2. Additionally, or alternatively, one or more components shown in FIG. 13 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1300. In some aspects, the reception component 1302 may include one or more antennas, a demodulator, a MIMO detector, a receive processor, a controller/processor, a memory, or a combination thereof, of the UE described above in connection with FIG. 2.

The transmission component 1304 may transmit communications, such as reference signals, control information, data communications, or a combination thereof, to the apparatus 1306. In some aspects, one or more other components of the apparatus 1300 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modulator, a transmit MIMO processor, a transmit processor, a controller/processor, a memory, or a combination thereof, of the UE described above in connection with FIG. 2. In some aspects, the transmission component 1304 may be co-located with the reception component 1302 in a transceiver.

The multiplex component 1308 may multiplex an SR associated with a first priority and a first PUCCH format with a HARQ-ACK associated with a second priority and a second PUCCH format to form a multiplexed SR and HARQ-ACK. The transmission component 1304 may transmit, to a base station, the multiplexed SR and HARQ-ACK using a sequence in a PUCCH format 1 resource, wherein the sequence is based at least in part on whether the SR is a positive value or a negative value.

The reception component 1302 may receive, from the base station, an indication of the first cyclic shift index. The determination component 1310 may determine the second cyclic shift index based at least in part on the first cyclic shift index and a maximum available distance between the first cyclic shift index and the second cyclic shift index. The reception component 1302 may receive, from the base station, an indication of the first cyclic shift index and the second cyclic shift index.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

Figure 14:
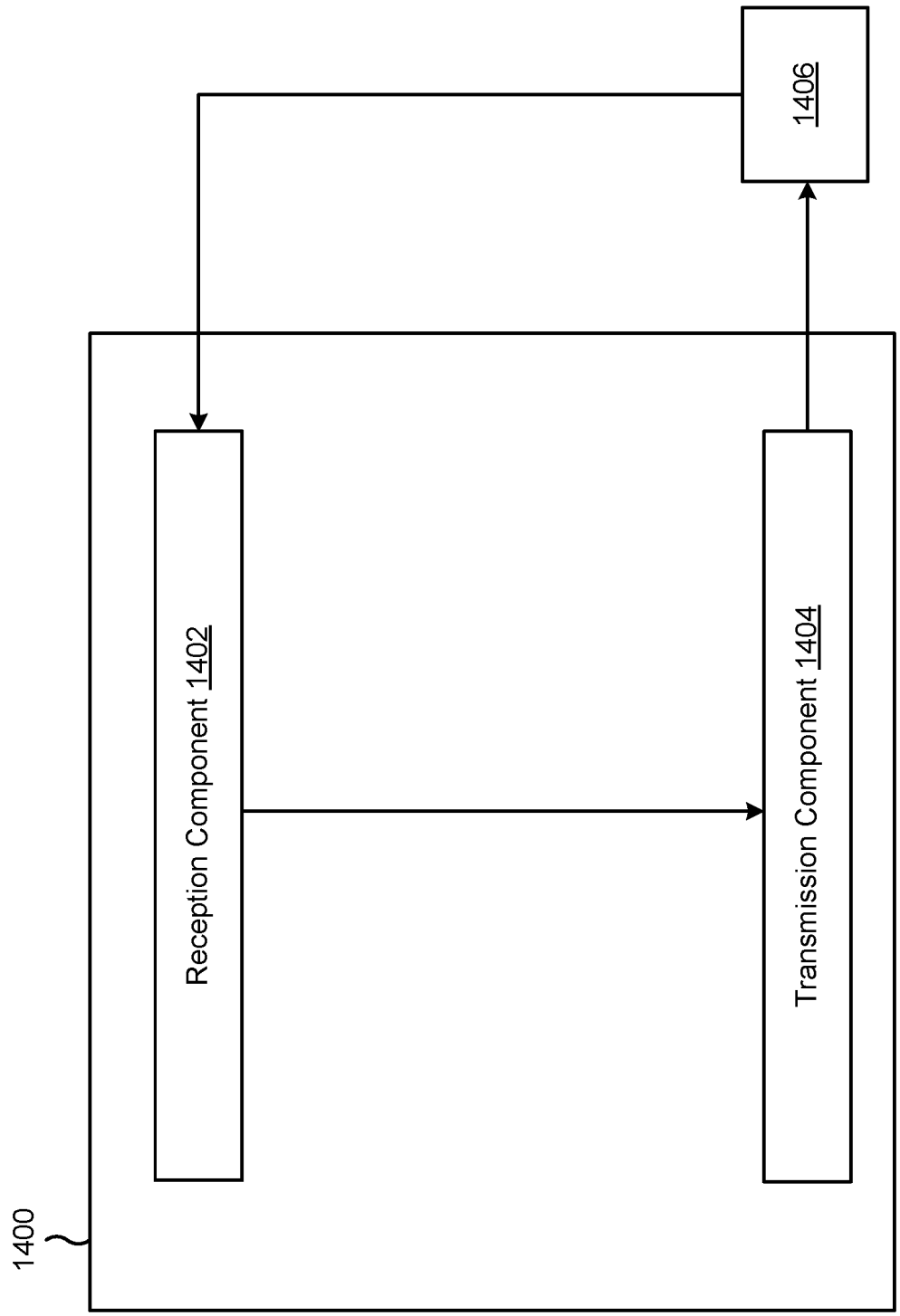

FIG. 14 is a block diagram of an example apparatus 1400 for wireless communication. The apparatus 1400 may be a base station, or a base station may include the apparatus 1400. In some aspects, the apparatus 1400 includes a reception component 1402 and a transmission component 1404, which may be in communication with one another (for example, via one or more buses and/or one or more other components). As shown, the apparatus 1400 may communicate with another apparatus 1406 (such as a UE, a base station, or another wireless communication device) using the reception component 1402 and the transmission component 1404.

In some aspects, the apparatus 1400 may be configured to perform one or more operations described herein in connection with FIGS. 8-10. Additionally, or alternatively, the apparatus 1400 may be configured to perform one or more processes described herein, such as process 1200 of FIG. 12. In some aspects, the apparatus 1400 and/or one or more components shown in FIG. 14 may include one or more components of the base station described above in connection with FIG. 2. Additionally, or alternatively, one or more components shown in FIG. 14 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the apparatus 1406. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1400. In some aspects, the reception component 1402 may include one or more antennas, a demodulator, a MIMO detector, a receive processor, a controller/processor, a memory, or a combination thereof, of the base station described above in connection with FIG. 2.

The transmission component 1404 may transmit communications, such as reference signals, control information, data communications, or a combination thereof, to the apparatus 1406. In some aspects, one or more other components of the apparatus 1400 may generate communications and may provide the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, a modulator, a transmit MIMO processor, a transmit processor, a controller/processor, a memory, or a combination thereof, of the base station described above in connection with FIG. 2. In some aspects, the transmission component 1404 may be co-located with the reception component 1402 in a transceiver.

The transmission component 1404 may transmit, to a UE, downlink information. The reception component 1402 may receive, from the UE and based at least in part on the downlink information, a multiplexed SR and HARQ-ACK in a PUCCH format 1 resource based at least in part on a sequence, wherein the sequence is based at least in part on whether the SR is a positive value or a negative value.

The transmission component 1404 may transmit, to the UE, an indication of the first cyclic shift index, wherein the second cyclic shift index is based at least in part on the first cyclic shift index and a maximum available distance between the first cyclic shift index and the second cyclic shift index. The transmission component 1404 may transmit, to the UE, an indication of the first cyclic shift index and the second cyclic shift index.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally, or alternatively, a set of (one or more) components shown in FIG. 14 may perform one or more functions described as being performed by another set of components shown in FIG. 14.

The following provides an overview of some Aspects of the present disclosure:

Aspect 1: A method of wireless communication performed by a user equipment (UE), comprising: multiplexing a scheduling request (SR) associated with a first priority and a first physical uplink control channel (PUCCH) format with a hybrid automatic repeat request acknowledgement (HARQ-ACK) associated with a second priority and a second PUCCH format to form a multiplexed SR and HARQ-ACK; and transmitting, to a base station, the multiplexed SR and HARQ-ACK using a sequence in a PUCCH format 1 resource, wherein the sequence is based at least in part on whether the SR is a positive value or a negative value.

Aspect 2: The method of Aspect 1, wherein: the sequence is a first sequence when the SR is the positive value; or the sequence is a second sequence when the SR is the negative value.

Aspect 3: The method of any of Aspects 1 or 2, wherein multiplexing the SR with the HARQ-ACK is based at least in part on a PUCCH format resource associated with the SR overlapping in a time domain with a PUCCH format resource associated with the HARQ-ACK.

Aspect 4: The method of any of Aspects 1 through 3, wherein the first priority associated with the SR is greater than the second priority associated with the HARQ-ACK.

Aspect 5: The method of any of Aspects 1 through 4, wherein the second priority associated with the HARQ-ACK is greater than the first priority associated with the SR.

Aspect 6: The method of any of Aspects 1 through 5, wherein the first PUCCH format associated with the SR is a PUCCH format 0 and the second PUCCH format associated with the HARQ-ACK is the PUCCH format 1.

Aspect 7: The method of any of Aspects 1 through 6, wherein the first PUCCH format associated with the SR is a PUCCH format 1 and the second PUCCH format associated with the HARQ-ACK is the PUCCH format 0.

Aspect 8: The method of any of Aspects 1 through 7, wherein the SR is one bit, and the HARQ-ACK is one bit or two bits.

Aspect 9: The method of Aspect 2, wherein: the first sequence is a base sequence with a first cyclic shift index; or the second sequence is a base sequence with a second cyclic shift index.

Aspect 10: The method of Aspect 9, wherein the first cyclic shift index and the second cyclic shift index are separated by a maximum available distance, and wherein the maximum available distance is equal to six.

Aspect 11: The method of Aspect 9, further comprising: receiving, from the base station, an indication of the first cyclic shift index; and determining the second cyclic shift index based at least in part on the first cyclic shift index and a maximum available distance between the first cyclic shift index and the second cyclic shift index.

Aspect 12: The method of Aspect 11, wherein receiving the indication of the first cyclic shift index comprises receiving the indication via radio resource control signaling, downlink control information, or a medium access control control element.

Aspect 13: The method of Aspect 9, further comprising: receiving, from the base station, an indication of the first cyclic shift index and the second cyclic shift index.

Aspect 14: The method of Aspect 13, wherein receiving the indication of the first cyclic shift index and the second cyclic shift index comprises receiving the indication via radio resource control signaling, downlink control information, or a medium access control control element.

Aspect 15: A method of wireless communication performed by a base station, comprising: transmitting, to a user equipment (UE), downlink information; and receiving, from the UE and based at least in part on the downlink information, a multiplexed scheduling request (SR) and hybrid automatic repeat request acknowledgement (HARQ-ACK) in a physical uplink control channel (PUCCH) format 1 resource based at least in part on a sequence, wherein the sequence is based at least in part on whether the SR is a positive value or a negative value.

Aspect 16: The method of Aspect 15, wherein the SR is associated with a first priority and the HARQ-ACK is associated with a second priority that is higher than the first priority.

Aspect 17: The method of any of Aspects 15 through 16, wherein the HARQ-ACK is associated with a first priority and the SR is associated with a second priority that is higher than the first priority.

Aspect 18: The method of any of Aspects 15 through 17, wherein the SR is associated with a first PUCCH format and the HARQ-ACK is associated with a second PUCCH format.

Aspect 19: The method of Aspect 18, wherein the first PUCCH format is a PUCCH format 0 and the second PUCCH format is the PUCCH format 1.

Aspect 20: The method of Aspect 18, wherein the first PUCCH format is the PUCCH format 1 and the second PUCCH format is a PUCCH format 0.

Aspect 21: The method of any of Aspects 15 through 20, wherein the SR is multiplexed with the HARQ-ACK based at least in part on a PUCCH format resource associated with the SR overlapping in a time domain with a PUCCH format resource associated with the HARQ-ACK.

Aspect 22: The method of any of Aspects 15 through 21, wherein the SR is one bit, and the HARQ-ACK is one bit or two bits.

Aspect 23: The method of any of Aspects 15 through 22, wherein: the sequence is a first sequence when the SR is the positive value; or the sequence is a second sequence when the SR is the negative value.

Aspect 24: The method of Aspect 23, wherein: the first sequence is a base sequence with a first cyclic shift index; or the second sequence is a base sequence with a second cyclic shift index.

Aspect 25: The method of Aspect 24, wherein the first cyclic shift index and the second cyclic shift index are separated by a maximum available distance, and wherein the maximum available distance is equal to six.

Aspect 26: The method of Aspect 24, further comprising: transmitting, to the UE, an indication of the first cyclic shift index, wherein the second cyclic shift index is based at least in part on the first cyclic shift index and a maximum available distance between the first cyclic shift index and the second cyclic shift index.

Aspect 27: The method of Aspect 26, wherein transmitting the indication of the first cyclic shift index comprises transmitting the indication via radio resource control signaling, downlink control information, or a medium access control control element.

Aspect 28: The method of Aspect 24, further comprising: transmitting, to the UE, an indication of the first cyclic shift index and the second cyclic shift index.

Aspect 29: The method of Aspect 28, wherein transmitting the indication of the first cyclic shift index and the second cyclic shift index comprises transmitting the indication via radio resource control signaling, downlink control information, or a medium access control control element.

Aspect 30: An apparatus for wireless communication at a device, comprising a processor; memory coupled with the processor; and instructions stored in the memory and executable by the processor to cause the apparatus to perform the method of one or more of Aspects 1-14.

Aspect 31: A device for wireless communication, comprising a memory and one or more processors coupled to the memory, the memory and the one or more processors configured to perform the method of one or more of Aspects 1-14.

Aspect 32: An apparatus for wireless communication, comprising at least one means for performing the method of one or more of Aspects 1-14.

Aspect 33: A non-transitory computer-readable medium storing code for wireless communication, the code comprising instructions executable by a processor to perform the method of one or more of Aspects 1-14.

Aspect 34: A non-transitory computer-readable medium storing a set of instructions for wireless communication, the set of instructions comprising one or more instructions that, when executed by one or more processors of a device, cause the device to perform the method of one or more of Aspects 1-14.

Aspect 35: An apparatus for wireless communication at a device, comprising a processor; memory coupled with the processor; and instructions stored in the memory and executable by the processor to cause the apparatus to perform the method of one or more of Aspects 15-29.

Aspect 36: A device for wireless communication, comprising a memory and one or more processors coupled to the memory, the memory and the one or more processors configured to perform the method of one or more of Aspects 15-29.

Aspect 37: An apparatus for wireless communication, comprising at least one means for performing the method of one or more of Aspects 15-29.

Aspect 38: A non-transitory computer-readable medium storing code for wireless communication, the code comprising instructions executable by a processor to perform the method of one or more of Aspects 15-29.

Aspect 39: A non-transitory computer-readable medium storing a set of instructions for wireless communication, the set of instructions comprising one or more instructions that, when executed by one or more processors of a device, cause the device to perform the method of one or more of Aspects 15-29.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
multiplexing a scheduling request (SR) associated with a first priority and a first physical uplink control channel (PUCCH) format with a hybrid automatic repeat request acknowledgement (HARQ-ACK) associated with a second priority and a second PUCCH format to form a multiplexed SR and HARQ-ACK; and
transmitting, to a base station, the multiplexed SR and HARQ-ACK using a sequence in a PUCCH format 1 resource, wherein the sequence comprises a first sequence with a first cyclic shift index when the SR is a positive value and wherein the sequence comprises a second sequence with a second cyclic shift index when the SR is a negative value.

2. The method of claim 1, wherein multiplexing the SR with the HARQ-ACK is based at least in part on a PUCCH format resource associated with the SR overlapping in a time domain with a PUCCH format resource associated with the HARQ-ACK.

3. The method of claim 1, wherein the first priority associated with the SR is greater than the second priority associated with the HARQ-ACK.

4. The method of claim 1, wherein the second priority associated with the HARQ-ACK is greater than the first priority associated with the SR.

5. The method of claim 1, wherein the first PUCCH format associated with the SR is a PUCCH format 0 and the second PUCCH format associated with the HARQ-ACK is the PUCCH format 1.

6. The method of claim 1, wherein the first PUCCH format associated with the SR is a PUCCH format 1 and the second PUCCH format associated with the HARQ-ACK is the PUCCH format 0.

7. The method of claim 1, wherein the SR is one bit, and the HARQ-ACK is one bit or two bits.

8. The method of claim 1, wherein the sequence is the first sequence or the second sequence, wherein the first sequence is a first base sequence with the first cyclic shift index or the second sequence is a second base sequence with second cyclic shift index.

9. The method of claim 8, wherein the first cyclic shift index and the second cyclic shift index are separated by a maximum available distance, and wherein the maximum available distance is equal to six.

10. The method of claim 8, further comprising:
receiving, from the base station, an indication of the first cyclic shift index; and
determining the second cyclic shift index based at least in part on the first cyclic shift index and a maximum available distance between the first cyclic shift index and the second cyclic shift index.

11. The method of claim 10, wherein receiving the indication of the first cyclic shift index comprises receiving the indication via radio resource control signaling, downlink control information, or a medium access control control element.

12. The method of claim 8, further comprising:
receiving, from the base station, an indication of the first cyclic shift index and the second cyclic shift index.

13. The method of claim 12, wherein receiving the indication of the first cyclic shift index and the second cyclic shift index comprises receiving the indication via radio resource control signaling, downlink control information, or a medium access control control element.

14. The method of claim 8, wherein the first base sequence is the same as the second base sequence.

15. A method of wireless communication performed by a base station, comprising:
transmitting, to a user equipment (UE), downlink information; and
receiving, from the UE and based at least in part on the downlink information, a multiplexed scheduling request (SR) and hybrid automatic repeat request acknowledgement (HARQ-ACK) in a physical uplink control channel (PUCCH) format 1 resource based at least in part on a sequence, wherein the sequence comprises a first sequence with a first cyclic shift index when the SR is a positive value and wherein the sequence comprises a second sequence with a second cyclic shift index when the SR is a negative value.

16. The method of claim 15, wherein the SR is associated with a first priority and the HARQ-ACK is associated with a second priority that is higher than the first priority.

17. The method of claim 15, wherein the HARQ-ACK is associated with a first priority and the SR is associated with a second priority that is higher than the first priority.

18. The method of claim 15, wherein the SR is associated with a first PUCCH format and the HARQ-ACK is associated with a second PUCCH format.

19. The method of claim 18, wherein the first PUCCH format is a PUCCH format 0 and the second PUCCH format is the PUCCH format 1.

20. The method of claim 18, wherein the first PUCCH format is the PUCCH format 1 and the second PUCCH format is a PUCCH format 0.

21. The method of claim 15, wherein the SR is multiplexed with the HARQ-ACK based at least in part on a PUCCH format resource associated with the SR overlapping in a time domain with a PUCCH format resource associated with the HARQ-ACK.

22. The method of claim 15, wherein the SR is one bit, and the HARQ-ACK is one bit or two bits.

23. The method of claim 15, wherein:
the first sequence is a first base sequence with the first cyclic shift index; or
the second sequence is a second base sequence with the second cyclic shift index.

24. The method of claim 23, wherein the first cyclic shift index and the second cyclic shift index are separated by a maximum available distance, and wherein the maximum available distance is equal to six.

25. The method of claim 23, further comprising:
transmitting, to the UE, an indication of the first cyclic shift index, wherein the second cyclic shift index is based at least in part on the first cyclic shift index and a maximum available distance between the first cyclic shift index and the second cyclic shift index.

26. The method of claim 25, wherein transmitting the indication of the first cyclic shift index comprises transmitting the indication via radio resource control signaling, downlink control information, or a medium access control control element.

27. The method of claim 23, further comprising:
transmitting, to the UE, an indication of the first cyclic shift index and the second cyclic shift index, wherein transmitting the indication comprises transmitting the indication via radio resource control signaling, downlink control information, or a medium access control control element.

28. The method of claim 23, wherein the first base sequence is the same as the second base sequence.

29. A user equipment (UE) for wireless communication, comprising:
a memory; and
one or more processors, coupled to the memory, configured to:
multiplex a scheduling request (SR) associated with a first priority and a first physical uplink control channel (PUCCH) format with a hybrid automatic repeat request acknowledgement (HARQ-ACK) associated with a second priority and a second PUCCH format to form a multiplexed SR and HARQ-ACK; and
transmit, to a base station, the multiplexed SR and HARQ-ACK using a sequence in a PUCCH format 1 resource, wherein the sequence comprises a first sequence with a first cyclic shift index when the SR is a positive value and wherein the sequence comprises a second sequence with a second cyclic shift index when the SR is a negative value.

30. A base station for wireless communication, comprising:
   a memory; and
   one or more processors, coupled to the memory, configured to:
      transmit, to a user equipment (UE), downlink information; and
      receive, from the UE and based at least in part on the downlink information, a multiplexed scheduling request (SR) and hybrid automatic repeat request acknowledgement (HARQ-ACK) in a physical uplink control channel (PUCCH) format 1 resource based at least in part on a sequence, wherein the sequence comprises a first sequence with a first cyclic shift index when the SR is a positive value and wherein the sequence comprises a second sequence with a second cyclic shift index when the SR is a negative value.

* * * * *